INVENTOR
John H. Brodhun
BY Ely & Frye
ATTORNEYS

Aug. 30, 1949.  J. H. BRODHUN  2,480,319
MACHINE TOOL

Filed Nov. 8, 1944.  4 Sheets-Sheet 4

INVENTOR
John H. Brodhun
BY Ely & Frye
ATTORNEYS

Patented Aug. 30, 1949

2,480,319

UNITED STATES PATENT OFFICE 2,480,319

MACHINE TOOL

John H. Brodhun, Detroit, Mich.

Application November 8, 1944, Serial No. 562,458

6 Claims. (Cl. 29—37)

This invention relates to lathes and like machine tools and, more particularly, to an interlocked movement of a cut-off tool slide and bar stop for use in an "automatic" multispindle lathe.

In "automatic" multispindle lathes, as contrasted with the usual turret lathes in which tools are brought in sequence against one work piece, a plurality of work pieces, driven by a plurality of spindles, are carried in sequence or "indexed" to a plurality of cutting tools moving in fixed or predetermined paths, the greatly increased output of such multispindle automatic lathes being due to the fact that all tools are working substantially simultaneously. The tool movement cycle in such automatic multispindle lathes is quite complex; in some types of multispindle lathes, the movement of each tool slide is controlled by a special cam for the particular work to be done by the tool or tools carried by a slide in producing a specific piece or article, but preferably each tool slide movement is controlled by a single permanent cam having a double cam track, as shown in the United States patent to Dixon, No. 2,007,564. The advantage of the latter type of tool slide movement is that, by a simple adjustment of the linkage between a tool slide and its operating cam, each tool movement may be readily adjusted within its total range of movement for any length or position of cutting stroke; thus, when a machine is producing one kind or size of article, it is comparatively simple to set up the machines to produce another kind or size of article.

In the type of machine disclosed in the aforementioned patent to Dixon and generally known as a "Wickman" type of machine, the cycle of a cutting or shaping tool movement may be analyzed into the following phases, starting with the actual cutting stroke: (1) the advance of the tool for the cutting stroke, which ends with a slight finishing dwell, (2) the return of the tool from the position at the end of the cutting stroke to the position at the start of the cutting stroke, (3) rapid further withdrawal of the tool to clear the work and permit indexing, (4) rapid advance of the tool from the fully withdrawn position to the start of the cutting stroke. The length of the cutting stroke is adjustable by means of suitable adjustable linkage connecting the tool slide to two permanent cam tracks, which linkage also resolves the movements obtained from the two cam tracks so that the actual tool movement is comprised of a comparatively slow advance during the cutting stroke, a single quick return (movements (2) and (3) combined) to the fully withdrawn position to permit indexing, and then a rapid advance to the initial cutting position (hereinafter referred to as the "rapid idle" approach," the term "idle" being used because the tool does no work during that phase of the cycle.)

The cycle of movement of the cut-off or parting tool should be essentially the same as that of a cutting tool, except that obviously no finishing dwell is necessary at the end of the cutting stroke; however, the movement of the cut-off tool slide is complicated by the fact that it is desirable, at the cut-off position and within the time between indexing, not only to part a finished piece from the bar stock and withdraw the cut-off tool, but also to feed out new bar stock against a bar-stop which is advanced to an "in" position as the cut-off tool is withdrawn. It is the object of this invention to provide a mechanism to accomplish the foregoing movements of a cut-off tool and a bar-stop at the cut-off position in a multispindle lathe. This object of my invention is accomplished by a mechanism in which the cut-off tool slide is operated directly by but one cam track (as contrasted to two tracks required in the machine disclosed in the above identified Dixon patent) and the bar-stop is operated by another cam track, the two movements being interlocked to provide a shifting fulcrum in the cut-off tool slide operating linkage whereby quick return and rapid idle approach is obtained in the cycle of movement of the cut-off tool slide. In addition to the relative simplicity of the preferred embodiment of my invention, it is a further advantage of such a mechanism that there is no abrupt change in acceleration of the tool slide so that the tool moves into and out of the cutting stroke without sudden shocks or chattering.

It is another object of this invention to provide a linkage for driving a tool slide which is not only adjustable to vary the length of a cutting stroke but which will also permit the length of the cutting stroke to be varied without movement of the tool slide when the adjustment is made at a predetermined point in the cutting stroke, preferably the end of the cutting stroke. This object of my invention is achieved by employing a linkage containing an arcuate crank arm and a connecting rod carried by a crank pin slidably mounted in the arcuate crank arm, the arcuate crank arm and the wrist pin of the connecting rod being concentric at the aforesaid predetermined point in the cutting stroke. The advantage of this aspect of my invention is that the length of a cutting stroke may be varied in changing the setup of the multispindle lathe from the production of one article to another without necessarily having to change the position of the tool on the tool slides; this arrangement is particularly advantageous in the linkage for driving the slide of a cut-off tool, for the end of the stroke of a cut-off tool is almost always at or just slightly beyond the center of the spindle, regardless of the length of the cut-off tool cutting stroke. This aspect of my invention also often saves tool setting time when the linkage is employed in driving the slides of cutting or shaping tools.

Other objects and advantages of my invention will be apparent from the following specification, claims, and drawings, in which:

Figure 1:
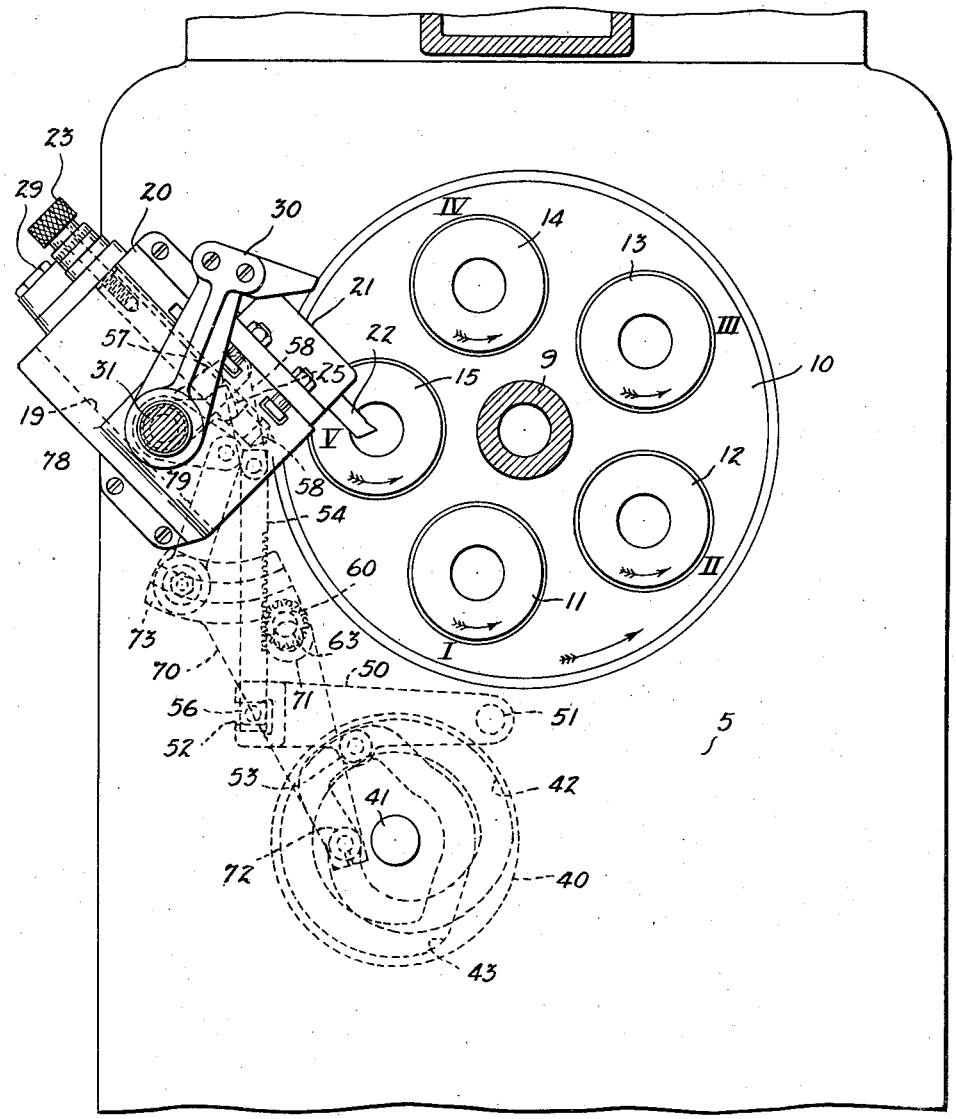
Fig. 1 is a transverse elevation looking toward the spindles of a multispindle lathe employing a preferred embodiment of my invention.
Figure 2:
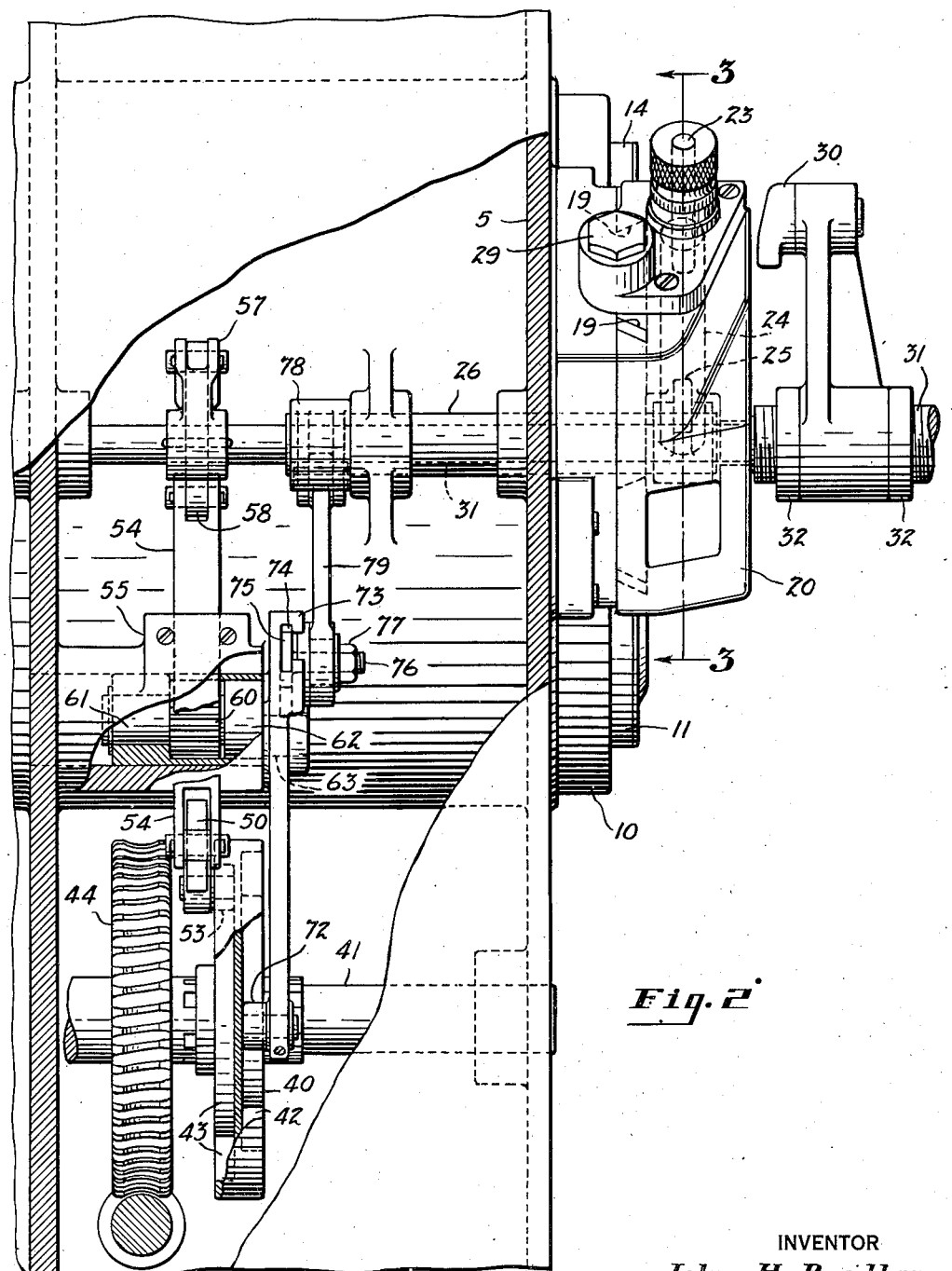
Fig. 2 is an enlarged detail side elevation, partly broken away, of the machine shown in Fig. 1.

Referring to Figs. 1 and 2 of the drawings, the frame 5 of the head of a multispindle lathe supports a longitudinal drum staff 9 on which is rotatably mounted the spindle drum 10. The drum 10 carries the equally spaced driven spindles (five in this instance) 11, 12, 13, 14, and 15 shown, respectively, at the indexed positions I, II, III, IV, V of the drum 10. By suitable mechanisms, the drum 10 is intermittently indexed so that the several spindles are advanced to the next succeeding position. At each position any one of a variety of cutting tools may be engaged with work pieces carried by the spindles until at position V the completed piece is parted off by the cut-off tool and a new length of bar stock is fed through the spindle. The mechanism for indexing the drum 10, driving the spindles between drum indexing periods, the tool slides and slide driving mechanisms for the various tools, and the like, are not shown since these various elements form no part of this invention and are consequently omitted for clarity of illustration.

At index position V, the frame 5 is provided with suitable ways 19 in which the cut-off tool cross-slide 20 is mounted. The cut-off slide 20 carries a block 21 in which the cut-off tool 22 is mounted so that, as the slide 20 is moved in the ways 19, the cutting edge of the tool 22 moves radially to and from the center of the spindle at position V, or cut-off position, of the indexed drum 10.

Figure 3:
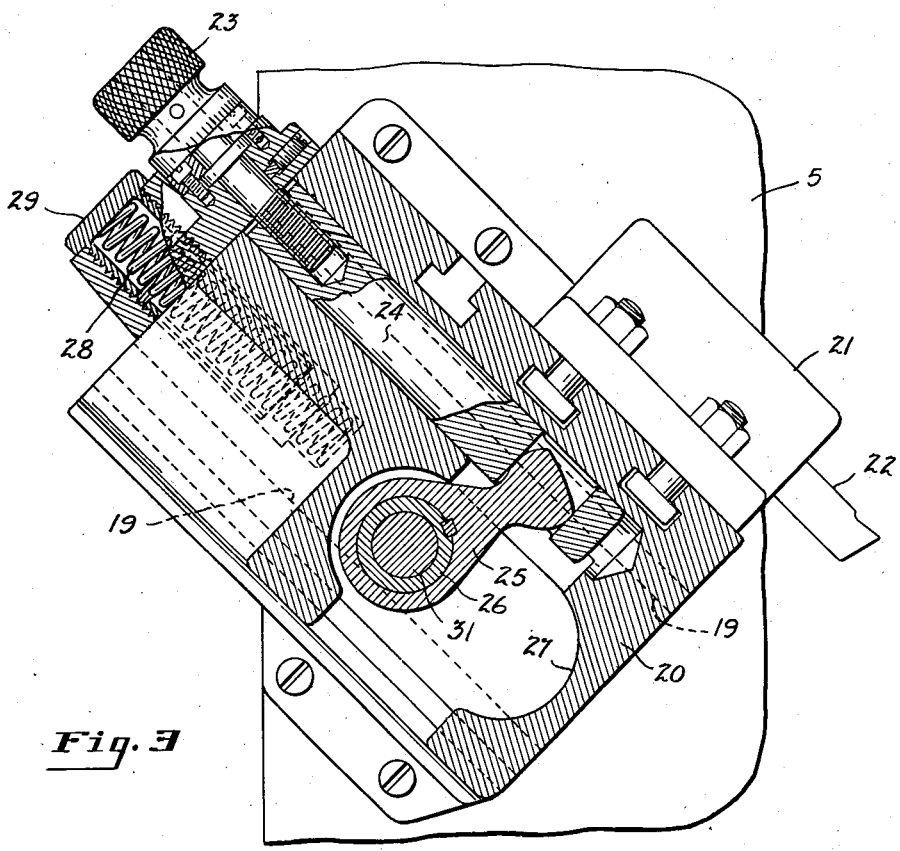
Fig. 3 is an enlarged detail section taken along the line 3—3 of Fig. 2.

As shown in detail in Fig. 3, a micrometer screw 23 is journaled for rotational movement in the rear of the slide 20, suitable setscrews being provided to lock the screw 23 in its adjusted position. The screw 23 is threadedly mated with the yoke member 24, which is slidably mounted within the slide 20, the position of the yoke member 24 within the slide 20 being fixed when the screw 23 is locked by its setscrews. The yoke member 24 engages the end of the oscillatable slide lever 25, which is mounted on a slide lever sleeve 26 extending into an opening 27 in the slide 20. Thus, as the lever 25 is oscillated, the slide 20 is slid in its ways 19 by the camming action of the lever 25 in the yoke 24, the length of the stroke of the slide 20 being obviously dependent upon the angle through which the lever 25 is oscillated. It should also be apparent that the position of the cutting edge of the tool 22 is adjustable with respect to the center of the spindle at position V (and to the lever 25) by adjusting the screw 23 to advance or withdraw the slide with respect to the yoke 24.

As the lever 25 oscillates to the right (in Fig. 3) to advance the cutting tool, the load on the cutting tool will cause the lever 25 to engage the forward portion of the yoke 24. To take up any lost motion between the end of the lever 25 and the yoke 24, a compression spring 28 is engaged between the frame 5 and a pillow nut 29 carried by the slide 20.

The bar-stop 30 is mounted on the bar-stop shaft 31, which is suitably journaled in the frame 5 and extends through the opening 27 in the slide 20, being concentric with the slide lever sleeve 26. The bar-stop 30 is longitudinally adjustable on the shaft 31 to permit the desired length of bar stock to be fed through the spindle at position V, threaded collars 32 being employed in this instance to lock the bar-stop 30 in the desired longitudinal position on its shaft 31. With the bar-stop shown in its fully withdrawn, or "out," position in Fig. 1 and swung to its fully advanced, or "in," position (which locates it in front of a spindle at the cut-off position) in Fig. 6, it is apparent that the operation of the bar-stop 30 is controlled by oscillating its shaft 31.

The linkage for oscillating the slide lever sleeve 26 and the bar-stop shaft 31 in the proper timed relationship is driven by the rotating face cam 40, mounted on the cam drive shaft 41 which is suitably journaled in the frame 5. One face of the cam is provided with a cutting stroke track 42 which drives only the cut-off tool slide 20, and the other face of the cam is provided with a bar-stop track 43 to operate the bar -stop 30. The bar-stop cam track also operates a fulcrum shifting mechanism, described below, to provide quick return and idle advance movement for the tool slide 20. The shaft 41 carries suitable gearing 44 connected to the drive for the drum 10 to synchronize the cam 40 with the drum 10 so that the number of revolutions of the cam 40 per revolution of the drum 10 will be equal to the number of spindles carried by the drum.

The linkage for operating the bar-stop 30 is simplest and, therefore, explained first. As shown in Figs. 1, 2, 5, and 6 of the drawings, a follower lever 50 is pivoted at one end on a pin 51 (fixed in the frame 5) and is provided at the other end with an open yoke 52. Intermediate of its ends, the lever 50 carries a cam follower 53 engaged in the bar-stop cam track 43. A vertically extending rack 54 is slidably mounted in the bearing block 55 (fixed to the frame 5), the rack 54 being reciprocated as the lever 50 is oscillated by its follower 53 running in the cam track 43, the connection between the rack 54 and lever 50 comprising a yoke block 56 pivotally mounted on the lower end of the rack 54 and slidably received in the yoke 52 of the lever 50. The oscillatable bar-stop shaft 31 carries a rocker arm 57 keyed to the shaft 31 so that the angularity of the rocker arm 57 and bar-stop 30 is fixed with respect to the shaft 31. The swinging end of the rocker arm 57 is connected to the upper end of the rack 54 by means of the connecting link 58.

Figures 5, 6:
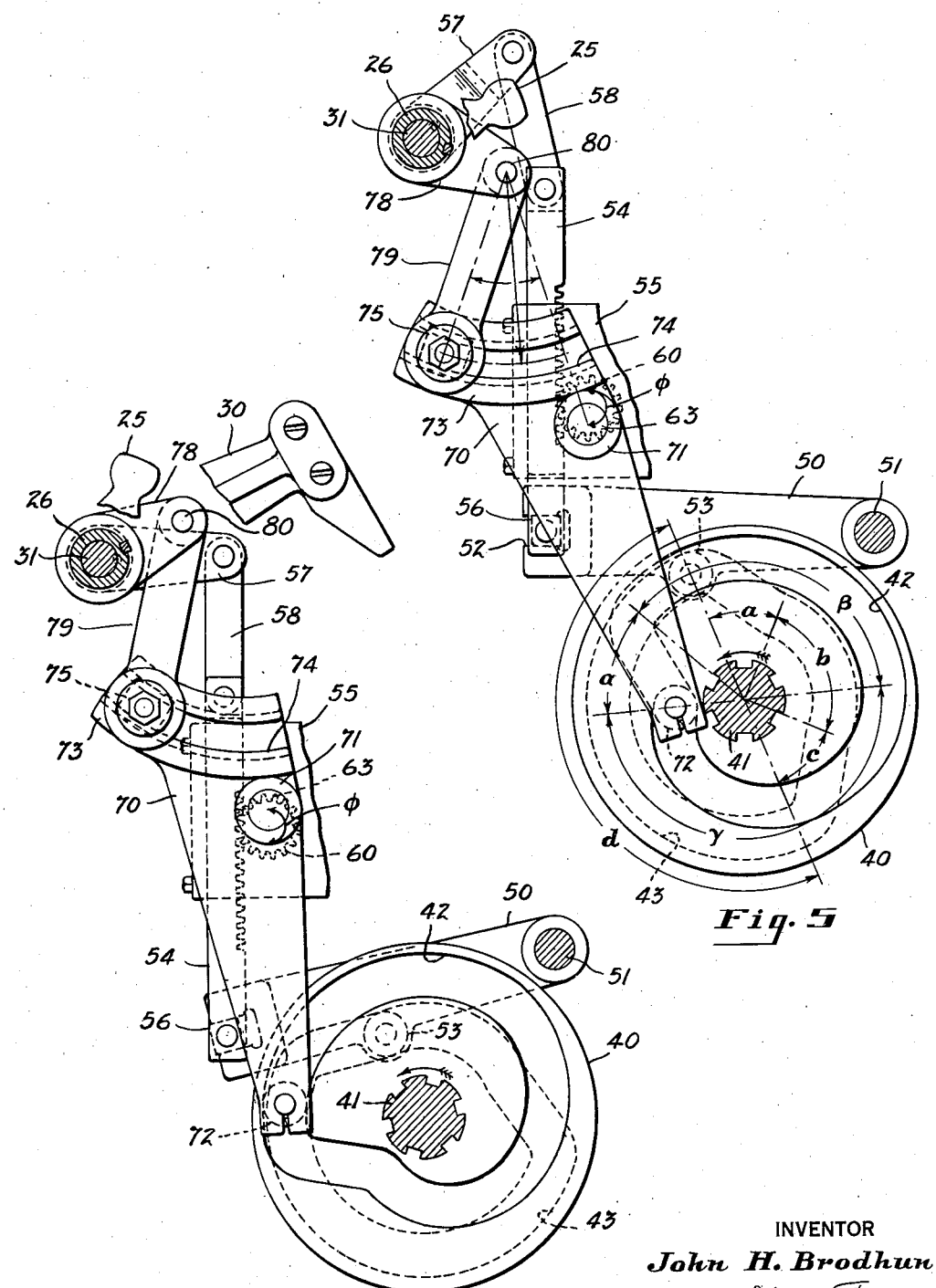
Fig. 5 is a detail view showing the tool slide and bar stop linkages in one position.
Fig. 6 is a detail view similar to Fig. 5 showing the linkages in another position.

The operation of the bar-stop linkage should thus be readily apparent from Figs. 5 and 6 of the drawings, Fig. 5 showing the various linkage elements in the positions shown in Figs. 1 and 2 of the drawings. As the cam 40 rotates through the angle $a$ of the cam track 43, the follower 53 is drawn from the outer dwell surface to the inner dwell surface of the track 43, and the lever 50, rack 54, link 58 and rocker 57 are all pulled down to oscillate the bar-stop shaft 31 and swing the bar-stop 30 from its fully withdrawn, or "out" position, as shown in Figs. 1 and 2, to its operative, or "in," position, as shown in Fig. 6, in front of a spindle at position V of the drum 10. The bar-stop 30 remains in its "in" position while the cam 40 turns through the angle $b$ and the follower 53 rides in the corresponding inner dwell of track 43. As the cam 40 turns through the angle $c$ and carries the follower 53 from the inner dwell to the outer dwell of the track 43, the bar-stop linkage elements are raised from the lowered position shown in Fig. 6 to the raised position shown in Fig. 5 and the bar-stop is correspondingly raised to its "out" position. As the cam 40 turns through the angle $d$ to complete the revolution, the follower 53 rides in the outer dwell of the track 43 and the bar-stop 30 is correspondingly held in its "out" position.

As outlined above, the bar-stop movement is interlocked with the cut-off tool slide movement, the actual interlock elements comprising a rack pinion 60 journaled at 61 and 62 in the bearing block 55 (see Fig. 2), the teeth of pinion 60 engaging with the teeth of the rack 54, as shown in Figs. 1, 5, and 6. Extending outwardly of the pinion 60 beyond the journal 62 is the integral eccentric fulcrum 63, the eccentric fulcrum being positioned with respect to the rack 54 and pinion 60 so that when the bar-stop is in its "out" position and the rack 54 is raised (Fig. 5), the fulcrum 63 is at its lowermost position. Thus, when the bar-stop is moved to its "in" position by pulling down the rack 54, the rack pinion is rotated through a half-turn and the fulcrum is moved to its uppermost position, the center of the fulcrum moving through the semicircular path $\phi$ (Figs. 5 and 6) as the rack 54 is reciprocated during the operation of the bar-stop linkage.

The tool-slide linkage comprises a floating quadrant 70 having a bearing boss 71 engaging the eccentric fulcrum 63, so that the quadrant is pivotally mounted on the eccentric fulcrum 63. One arm of the quadrant 70 carries a follower roller 72, which runs in the cutting stroke cam track 42 of the cam 40. Normally angularly disposed with respect to the effective lever arm between the pivot boss 71 and the follower 72 is a variable second lever arm provided by an arcuate guide 73 having a slot 74, in which a lockable pivot block 75 is slidably received. The pivot block 75 is provided with a bolt 76 on which is mounted a bushing (not shown) which can be engaged between the nut 77 on the bolt 76 and the outer face of the guide 73 to permit the pivot block 75 to be locked at any desired position in the slot 74. The sleeve 26 carries a rocker arm 78 which is angularly fixed with respect to the slide lever 25, also carried by the sleeve 26. The rocker arm 78 and pivot block 75 are connected by the rod 79 which is pivoted on the wrist pin 80, carried by the rocker arm, and on the bushing, carried by the pivot block bolt 76.

With the cutting tool at the most advanced position of its cutting stroke (as shown in Fig. 1), the cam follower 72 is at the radially innermost portion of the cam track 42, as shown in Fig. 5. It is important to note that when the cutting tool and the cam 42 and follower 72 are in this position, the arcuate slot 74 is concentric with the wrist pin 80. Thus, any movement of the pivot block 75 in the slot will permit the connecting rod 79 to swing on the wrist pin 80 without moving the rocker arm 78 and thus not moving the tool 22. Consequently, with the linkages in the position shown in Fig. 5, that is, when the tool is at the very end of its cutting stroke, the effective lever arm from the center of the fulcrum 63 to the center of the pivot block 75 may be varied without moving the tool.

Disregarding for the moment the effect of the shifting fulcrum 63, as the cam 40 moves through the angle $\alpha$ from the position shown in Fig. 5 to the position shown in Fig. 6, the cam follower 72 moves radially outwardly in the track 42 and the quadrant 70, thus pivoting on the fulcrum 63 and throwing the rocker arm 78 upwardly, by means of the connecting rod 79, to rock the slide lever 25 counterclockwise and withdraw the tool slide 20. As the cam 40 then continues to turn through the rather large angle $\beta$, the follower 72 rides on an outer circular dwell of the cam track 42 and the track 42 causes no pivoting of the quadrant on the fulcrum 63 due to the movement of the cam 40. As the cam 40 moves through the rather large angle $\gamma$ to complete its revolution, the cam track 42 curves radially inwardly, drawing the follower 72 comparatively slowly toward the center of the cam 40, pivoting the quadrant 70 on the fulcrum 63 and, through the connecting rod 79, rocking the arm 78 and lever 25 to force the tool slide 20 slowly forward to the end of its cutting stroke, as shown in Fig. 5, the curve of the cam track 42 in the angle $\gamma$ being so correlated with the angularity of the linkage that the tool slide is advanced at a substantially constant speed. It should be apparent that the amount of movement of the slide 20 due to the foregoing operation of the tool slide linkage is dependent upon the amount of throw effected by the variable lever arm of the quadrant 70 and that by moving the block 75 from its position of substantially maximum throw, as shown in the drawings, to a position where the center of the pivot block is aligned with the fulcrum 63 and follower 72, the length of the stroke of the slide 20 attributable to the cam 42 may be varied from a maximum to practically zero. When it is desirable, as in linkages for cutting or shaping tools, to vary the cutting stroke from a maximum to zero, then the quadrant 70 may be modified by locating the arcuate guide slot so that the center of the slot will, at one point, coincide with the center of the fulcrum for the quadrant. At such a point of coincidence, the length of the variable lever arm would, of course, be zero and no amount of pivoting of the quadrant on its fulcrum would effect movement of the tool slide. And further, if the arcuate arm of the quadrant is concentric with the wrist pin of its connecting rod at the end of the cutting stroke, then, in the modification in which the tool slide cutting stroke can be reduced to zero, the point of zero stroke of the slide will be the end point of any cutting stroke of the slide.

The effect of the interlocking rack pinion 60 on the movement of the tool slide should now be apparent. Disregarding the effect of the cam track 42 other than as it serves to hold the follower 72 as a pivot for the quadrant 70, as the rack 54 is pulled down by movement of the follower 53 in the track 43 while the cam 40 moves through the angle $a$, the eccentric fulcrum 63 shifts from its lower position, shown in Fig. 5, to its upper position, shown in Fig. 6, thus effecting a vertical movement of the quadrant 70 which, through the connecting rod 79, rocks the arm 78 counterclockwise to effect a rapid withdrawal of the tool slide 20. As the follower 53 runs in the outer dwell $b$ of the cam track 43, the fulcrum 63 is held in its raised position and no tool slide movement is effected by the interlock. As the follower 53 is drawn inwardly by portion $c$ of the cam track 43, the fulcrum 63 is dropped to its lower position, thus effecting a rapid advance of the tool slide. It is to be noted that the vertical movement of the quadrant due to the shifting of the fulcrum 63 is a harmonic projection of the semicircular path $\phi$ taken by the fulcrum. This means that there is no abrupt acceleration or deceleration in the movement of the tool slide attributable to the interlock and, as a consequence, the tool moves into its cutting stroke without a sudden jar, as will be more apparent from the following explanation of the effect of the combined tool slide movements.

Figure 4:
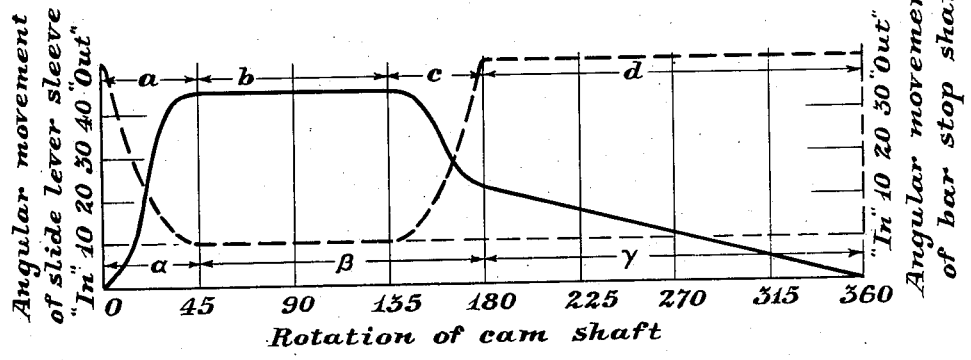
Fig. 4 is a pair of curves showing the relative angular movement of the tool slide lever sleeve and the bar stop shaft with respect to the rotation of the cam shaft for driving these elements.

Due to the angular displacement of the cam tracks 42 and 43 caused by the spacing of the followers 72 and 53, the relative timing of the tool slide and bar-stop movements and the combined effect of the shifting fulcrum 63 and cam track 42 on the tool slide movement are best shown in Fig. 4, in which the angular movements of the bar-stop shaft 31 (dotted line) and the angular movement of the slide lever sleeve 26 (solid line) are plotted against the rotation of the cam shaft 41, the abscissas of the curves being spaced for clarity. As shown in Fig. 4, angles $a$ and $\alpha$ of the cam tracks 43 and 42 coincide, so that, as the bar-stop 30 moves to its "in" position, a very quick withdrawal of the tool is effected due to the simultaneous pivoting of the quadrant 70 on the fulcrum 63 by the cutting stroke cam track 42 and the lifting of the fulcrum 63 by the interlock rack pinion 60 as the rack 54 is drawn down by the bar-stop cam track 43. The bar-stop remains in its "in" position and the tool slide is fully withdrawn while the followers 53 and 72 are simultaneously riding on the dwells $b$ and $\beta$, respectively, of cams 43 and 42 (it is during this dwell period that a new length of bar stock is fed through the spindle at position V). As the follower 53 rides in the portion $c$ of the track 43, rapid withdrawal of the bar-stop to its "out" position is obtained and simultaneously a rapid approach of the tool is obtained, due only, however, to the shifting of the fulcrum 63, since the follower 72 is still riding on the outer dwell $\beta$ of the cam track 42. (This is the rapid "idle" approach of the tool to the start of its cutting stroke; it is also the period in which the drum 10 is indexed.) During the remainder of the cycle, the bar-stop remains in its "out" position and the cut-off tool is advanced at a constant speed in its parting-off stroke due to relatively slow pivoting of the quadrant 70 as the follower 72 rides in the portion $\gamma$ of the cam track 42.

It is to be understood that the foregoing description of my invention is a disclosure of a preferred embodiment, which is capable of being modified in whole or in part without departing from the limits of my invention as set forth in the following claims.

What is claimed is:

1. In a multispindle lathe in which spindles are successively indexed to a cut-off position, a cut-off tool slide and a bar-stop adjacent the cut-off position, a linkage for advancing and retracting said tool slide, including a movable fulcrum and an element pivotally mounted on said fulcrum, a linkage for moving said bar-stop to "in" and "out" positions, and means operating said linkages in timed relationship so that said tool slide is advanced as said bar-stop is moved to its "out" position and retracted as said bar-stop is moved to its "in" position, and means operated by said bar-stop linkage to shift said fulcrum in said tool-slide linkage to increase the tool-slide movement effected by said tool-slide linkage.

2. In a machine of the class described, a cut-off tool slide, a bar-stop, a tool slide cam track, linkage connecting said tool slide and tool slide cam track to advance and retract said tool slide, including a movable fulcrum and a link pivoted on said fulcrum, a bar-stop cam track, a linkage connecting said bar-stop and bar-stop cam track to move said bar-stop to "in" and "out" positions, and means operated by said bar-stop linkage to shift said fulcrum, whereby increased movement of said tool slide linkage is obtained in addition to movement effected by said tool slide cam track.

3. In a mechanism of the class described, a tool slide, a bar-stop, a bar-stop cam track, a first linkage connecting said bar-stop and bar-stop cam track to actuate said bar-stop, said bar-stop cam track having connected dwell portions to hold said bar-stop in an operative "in" position and an inoperative "out" position, a tool slide cutting stroke cam track, a second linkage connecting said tool slide and cutting stroke cam track including means to vary the length of the cutting stroke of said slide, and means interlocking the movements of said first and second linkages to retract said tool slide beyond the start of its cutting stroke and to provide said tool slide with a relatively rapid approach from its point of maximum retraction to the start of its cutting stroke.

4. A mechanism as defined in claim 3, in which said second linkage includes a movable fulcrum and an element pivoted on said fulcrum and said interlocking means comprises means operated by said bar-stop cam track to move said fulcrum as said bar-stop is moved from its "in" to its "out" position and from its "out" to its "in" position.

5. A mechanism as defined in claim 3, in which said second linkage includes a movable fulcrum and means constituting a lever arm pivoted on said fulcrum, a member connected to said slide, a connecting rod, a wrist pin connecting said member and said connecting rod, and means connecting said connecting rod and said lever arm means to vary the effective length of the lever arm means by varying the distance between said fulcrum and the connection of said connecting rod to said lever arm means, said connecting rod being movable in an arcuate path concentric with said wrist pin, and said interlocking means comprising means operated by said bar-stop cam track to move said fulcrum as said bar-stop is moved from its "in" to its "out" position and from its "out" to its "in" position.

6. In a machine of the class described, a bar-stop, a cut-off tool slide, a bar-stop cam track, a linkage connecting said bar-stop to said bar-stop cam track including a first follower moving in said bar-stop cam track, said bar-stop cam track having connected "in" and "out" dwells to hold said bar-stop in an operative "in" position and an inoperative "out" position, a cutting stroke cam track, a linkage connecting said tool slide to said cutting stroke cam track including a second follower moving in said cutting stroke cam track, a lever member actuated by said follower, a movable fulcrum on which said lever member is pivoted, and means to vary the effective length of one arm of said lever member, said cutting stroke cam track having an advance portion to advance said slide in a cutting stroke and a connected return portion to retract said slide from the end to the start of the cutting stroke of said slide, and a dwell portion connecting said return portion to said advance portion, whereby said slide is successively advanced, returned, and held from advancing in a succeeding cutting stroke as said second follower moves in said dwell portion of said cutting stroke cam track, and means operated by said first follower to shift said fulcrum as said first follower moves between the dwell portion of said bar-stop cam track to increase the movement of said tool slide in addition to the movement effected by said cutting stroke cam, said cams operating in synchronism so that substantially simultaneously said first follower moves from the "out" dwell to the "in" dwell of the bar-stop cam track and said second follower moves in the return portion of said cutting stroke cam track to effect a quick return of said slide from the end of its cutting stroke to its position of maximum retraction as said bar-stop moves to its "in" position but so that said first follower moves from the "in" to the "out" dwell of said bar-stop cam track while said second follower moves in the dwell portion of said cutting stroke cam track to effect a relatively rapid idle advance of said tool slide from the position of maximum retraction to the start of its cutting stroke.

JOHN H. BRODHUN.

REFERENCES CITED

The following references are of record in the file of this patent:

UNITED STATES PATENTS

| Number | Name | Date |
|---|---|---|
| 904,866 | Gridley | Nov. 24, 1908 |
| 1,271,540 | Cone | July 9, 1918 |
| 2,007,564 | Dixon | July 9, 1935 |
| 2,347,372 | Silva et al. | Apr. 25, 1944 |
| 2,352,548 | Jobert et al. | June 27, 1944 |